US012645367B1

(12) United States Patent
Meghana et al.

(10) Patent No.: US 12,645,367 B1
(45) Date of Patent: Jun. 2, 2026

(54) USING THIN PROVISIONING READ ZEROS TO OPTIMIZE PURGE OPERATIONS

(71) Applicant: Sandisk Technologies, Inc., Milpitas, CA (US)

(72) Inventors: V. Meghana, Bengaluru (IN); Prabhakar Ballapalle, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/047,575

(22) Filed: Feb. 6, 2025

(51) Int. Cl.
*G06F 3/06* (2006.01)

(52) U.S. Cl.
CPC ............ *G06F 3/0616* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,996,883 B2 | 5/2021 | Kim | |
| 11,586,377 B2 | 2/2023 | Nagai | |
| 11,593,259 B2 | 2/2023 | McVay | |
| 11,735,269 B2 | 8/2023 | Luo | |
| 11,782,632 B2 | 10/2023 | Klein | |
| 11,941,271 B2 | 3/2024 | Kim | |
| 2010/0251009 A1* | 9/2010 | Stenfort | G06F 3/0661 |
| | | | 711/170 |

* cited by examiner

*Primary Examiner* — Brian R Peugh
(74) *Attorney, Agent, or Firm* — Arlene Neal; NEAL BLIBO LLC

(57) ABSTRACT

A storage device may reduce overhead associated with executing purge-related operations on a memory device. The storage device includes a memory device including blocks to store data A controller on the storage device may categorize blocks on the memory device based on a thin provisioning read zeros (TPRZ) value. The controller may separate data stored in the blocks on the memory device according to the TPRZ value. When the storage device receives a purge command from a host, the controller may condition a purge operation on a first TPRZ value and perform the purge operation on the-blocks associated with the first TPRZ value.

20 Claims, 5 Drawing Sheets

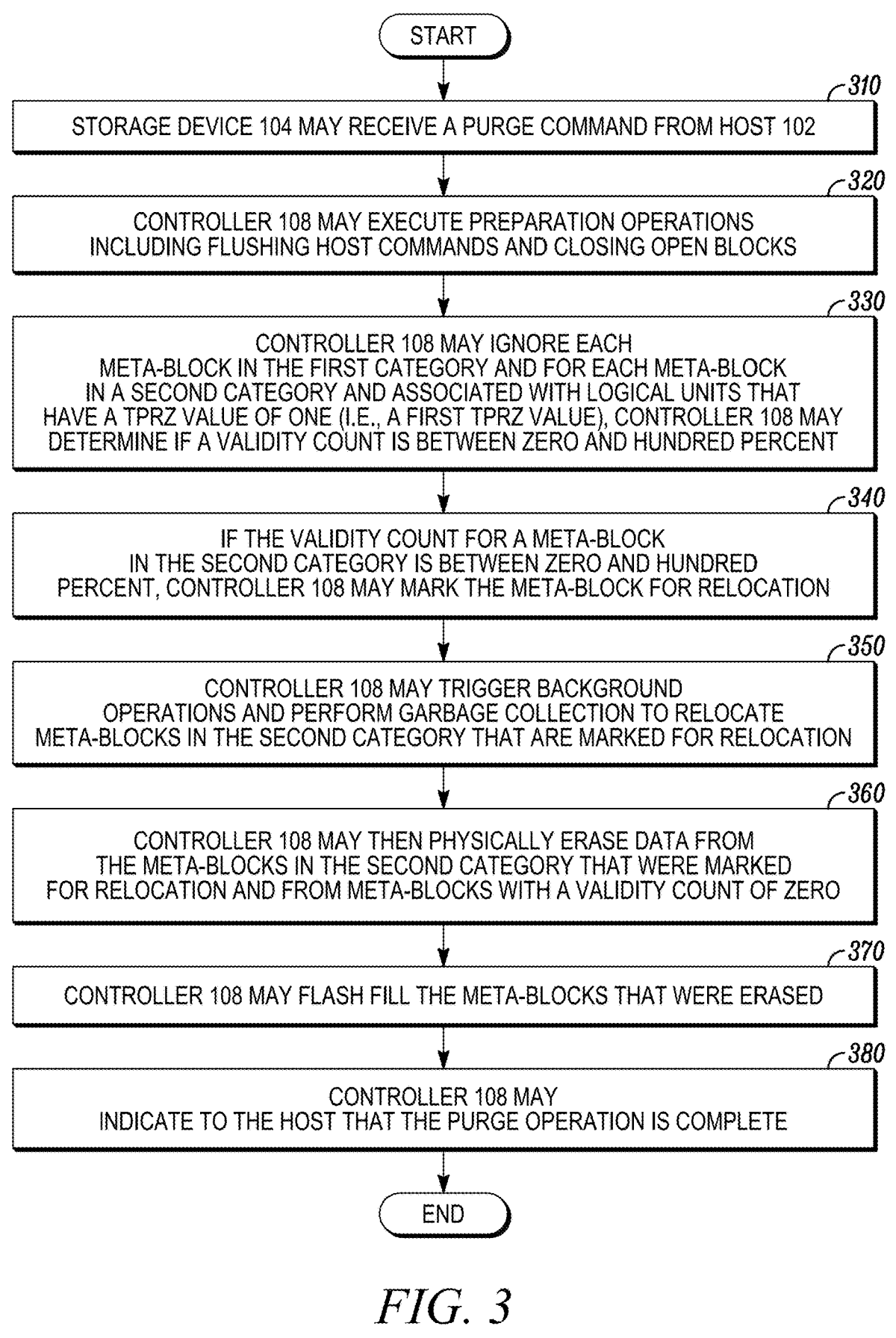

START

310

STORAGE DEVICE 104 MAY RECEIVE A PURGE COMMAND FROM HOST 102

320

CONTROLLER 108 MAY EXECUTE PREPARATION OPERATIONS
INCLUDING FLUSHING HOST COMMANDS AND CLOSING OPEN BLOCKS

330

CONTROLLER 108 MAY IGNORE EACH
META-BLOCK IN THE FIRST CATEGORY AND FOR EACH META-BLOCK
IN A SECOND CATEGORY AND ASSOCIATED WITH LOGICAL UNITS THAT
HAVE A TPRZ VALUE OF ONE (I.E., A FIRST TPRZ VALUE), CONTROLLER 108 MAY
DETERMINE IF A VALIDITY COUNT IS BETWEEN ZERO AND HUNDRED PERCENT

340

IF THE VALIDITY COUNT FOR A META-BLOCK
IN THE SECOND CATEGORY IS BETWEEN ZERO AND HUNDRED
PERCENT, CONTROLLER 108 MAY MARK THE META-BLOCK FOR RELOCATION

350

CONTROLLER 108 MAY TRIGGER BACKGROUND
OPERATIONS AND PERFORM GARBAGE COLLECTION TO RELOCATE
META-BLOCKS IN THE SECOND CATEGORY THAT ARE MARKED FOR RELOCATION

360

CONTROLLER 108 MAY THEN PHYSICALLY ERASE DATA FROM
THE META-BLOCKS IN THE SECOND CATEGORY THAT WERE MARKED
FOR RELOCATION AND FROM META-BLOCKS WITH A VALIDITY COUNT OF ZERO

370

CONTROLLER 108 MAY FLASH FILL THE META-BLOCKS THAT WERE ERASED

380

CONTROLLER 108 MAY
INDICATE TO THE HOST THAT THE PURGE OPERATION IS COMPLETE

END

*FIG. 3*

USING THIN PROVISIONING READ ZEROS TO OPTIMIZE PURGE OPERATIONS

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and data may be stored in the blocks in various formats, including a single-layer cell (SLC) format, a multi-layer cell (MLC) format, a triple-layer cell (TLC) format, a quadruple-layer cell (QLC) format, and so on. When data is erased from the memory device, the entire block of data is erased. The lifespan of the memory device may be limited by the number of program/erase cycles (P/E cycles) carried out on the memory device.

The host may assign a logical block address (LBA) to data stored in blocks on the memory device, wherein the LBA is a unique identifier for a unit of data. The LBAs may be mapped one-to-one to physical addresses on the memory device. The one-to-one LBA to physical address mappings may be stored in a logical-to-physical (L2P) table. A controller on the storage device may manage the mapping of LBAs to physical locations within the memory device so that when the host issues a command to access a unit of data, the controller may retrieve the data based on the mappings in the L2P table.

When the storage device is initially mounted, the host may configure logical units on the storage device. A logical unit may be used to group logical data. A descriptor associated with the logical unit may describe its characteristics, including, for example, the number of LBAs in the logical unit and the type of memory (for example, SLC/TLC) associated with the logical unit.

The host may invalidate data associated with a LBA by issuing a command to unmap the data from the LBA. In such a case, the L2P mapping may be modified, and the data may not be accessible via the LBA that was previously associated with the data. The data may however remain on the memory device and may be accessed by, for example, a hacker that may read the data directly from the physical device via means other than accessing the data via the LBA that was associated with the data. To prevent access to data that has been invalidated, the host may initiate a purge operation to enforce physical elimination of all invalidated data on the memory device.

The storage device may support thin provisioning management techniques that may be used to support erasures and/or overwrites. A thin provisioning read zeros (TPRZ) descriptor of a logical unit may specify if the host may retrieve invalidated data in that unit. When a TPRZ value for a logical unit is set to zero, the storage device may return any value stored at a physical location associated with an LBA in the logical unit, including invalidated data. When a TPRZ value for a logical unit is set to one, the storage device is to return zeros when data is requested for LBAs in the logical unit. As such, the TPRZ value for a logical unit being set to one implies that invalidated data must be securely removed. On the other hand, there may be no secure erasure guarantee for data associated with logical units with a TPRZ value of zero.

A meta-block in the storage device is said to be dirty if it includes invalidated data. The degree of dirtiness may be specified by a validity count (VC), which is a ratio of amount of valid data in a metablock to the total capacity of that meta-block. When the host initiates a purge operation to enforce the physical elimination of the invalidated data, the storage device may perform garbage collection, wherein valid data in the dirty meta-blocks may be relocated to other meta-block(s), before the dirty meta-blocks are physically erased. TLC blocks may not remain in the erased state for long due to "erase bake data retention" problem. The TLC blocks may thus be shallow-programmed (flash-fill) after erasure.

The storage device may store data from various logical units in the same meta-block, that is, data from logical units of different secure-erasure-criteria (TPRZ) may be stored in the same meta-block, In such a case, in executing the purge operation, the storage device may incur overhead (including increased the P/E cycles) erasing data which do not have to be securely erased.

SUMMARY OF THE INVENTION

In some implementations, a storage device may reduce overhead associated with executing purge-related operations on a memory device. The storage device includes a memory device including blocks to store data. A controller on the storage device may categorize blocks on the memory device based on a thin provisioning read zeros (TPRZ) value. The controller may separate data stored in the blocks on the memory device according to the TPRZ value. When the storage device receives a purge command from a host, the controller may condition a purge operation on a first TPRZ value and perform the purge operation on the-blocks associated with the first TPRZ value.

In some implementations, a method is provided on the storage device for reducing overhead associated with executing purge-related operations on a memory device. The method includes categorizing blocks on a memory device based on a thin provisioning read zeros (TPRZ) value and separating data stored in the-blocks on the memory device according to the TPRZ value. The method also includes receiving a purge command from a host, conditioning a purge-operation on a first TPRZ value, and performing the purge operation on the-blocks associated with the first TPRZ value.

In some implementations, a method is provided for reducing overhead associated with executing purge-related operations on a memory device. The method includes categorizing blocks on a memory device based on a thin provisioning read zeros (TPRZ) value and associating a first category of blocks with a TPRZ value of zero and a second category of blocks with a TPRZ value of one. The method also includes receiving a write command from a host or processing background operations to relocated data on the memory device. The method further includes programming data having the TPRZ value of zero in the first category of blocks and programming data having the TPRZ value of one in the second category of blocks. The method also includes receiving a purge command from the host, conditioning a purge-operation on a first TPRZ value associated with the second category of blocks, and performing the purge operation on the second category of blocks.

BRIEF DESCRIPTION OF THE DRAWINGS

FIG. 3 is an example flow diagram for executing purge operations on a storage device in accordance with some implementations.

Figure 1:
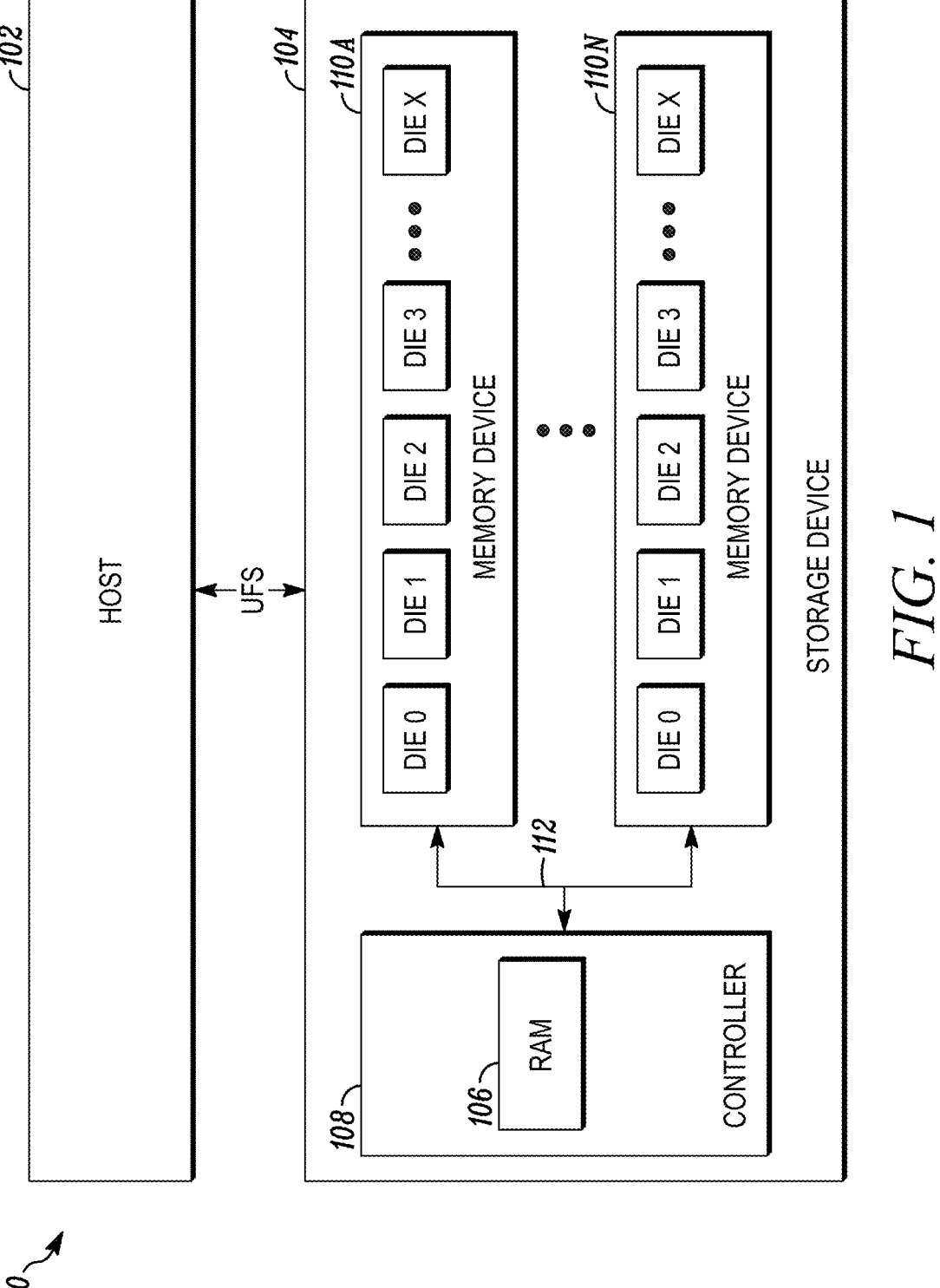
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Universal Flash Storage (UFS) protocol, and the like. Host 102 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a solid-state drive (SSD). RAM 106 may be, for example, static RAM (SRAM) or dynamic RAM (DRAM) that be used to temporarily store data on storage device 104. For example, RAM 106 may store the L2P table used on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include one or more dies (for example, DIE 0-DIE X) connected to a memory bus 112 including data lines and chip enable lines. The dies may be divided into blocks and data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. Memory device 110 may be included in storage device 104 or may be otherwise communicatively coupled to storage device 104.

Storage device 104 may include one or more meta dies (i.e., a logical group of dies) formed to operate multiple dies in parallel to improve the performance of storage device 104. When using a meta die, controller 108 may operate on a meta-block and meta page level. A meta-block is a logical block including one block from each die in the meta die and the meta page is a logical page including one page from each block in the meta-block. The controller may engage each page in the meta page in parallel to improve the performance of storage device 110.

When storage device 104 is initially mounted, host 102 may configure logical units that may be used to group logical data on the storage device. A descriptor associated with a logical unit may describe its characteristics, including, for example, the number of LBAs in the logical unit and the type of memory (for example, SLC/TLC) associated with the logical unit. A thin provisioning read zeros (TPRZ) type in a logical unit descriptor may indicate removal security and define if host 102 can retrieve invalidated data in the logical unit.

Host 102 may initiate operations to invalidate data stored on a meta-block. For example, host 102 may initiate an unmap operation for storage device 104 to invalidate data at specified LBA(s) and modify the mappings in the L2P table. Host 102 may also initiate a purge operation for storage device 104 to enforce the physical erasure of invalid data. In a current system, when host 102 initiates the purge operation, controller 108 may identify all invalid data on meta-blocks in memory device 110 and controller 108 may initiate physical erasure of the data on the meta-blocks with invalid data to ensure secure removal of the invalid data from memory device 110. Storage device 104 may store host or background data on memory device 110 in chunks/units. For example, storage device 104 may store data on memory device 110 in 4 KB chunks/flash management units (FMUs). Controller 108 may determine how many meta FMU (MFMU) (i.e., how many specific physical addresses on a meta-die/meta-block) include valid data (i.e., data that has not been unmapped or otherwise invalidated by host 102).

Controller 108 may identify invalid data on a meta-block by, for example, identifying a validity count for the meta-block. When controller 108 determines that the validity count for a meta-block is one hundred percent, controller 108 may determine that the meta-block includes only valid data and controller 108 may not mark the meta-block for erasure. When controller 108 determines that the validity count for a meta-block is between zero and one hundred percent, controller 108 may determine that the meta-block includes a mix of valid and invalid data, and controller 108 may initiate garbage collection to relocate the valid content from the meta-block so that the validity count for the meta-block may be zero. When controller 108 determines that the validity count of a meta-block is zero, controller 108 may determine that the meta-block includes only invalid/outdated/dirty data, and that the data on the meta-block may be physically erased to reclaim space.

In executing the purge operation on meta-blocks, controller 108 may execute preparation operations including flushing host commands and closing open blocks. Controller 108 may then identify meta-blocks where the validity count is between zero and one hundred percent and trigger background operations on the meta-blocks where the validity count is between zero and one hundred percent. As part of the background operation, controller 108 may execute garbage collection to relocate all of the valid data from a source meta-block to a destination meta-block, reducing the validity count of the source meta-block to zero. Controller 108 may then physically erase the data from the source meta-block and flash fill the source meta-block.

When storge device 104 completes the purge operation on all meta-block where the validity count is zero or between zero and one hundred percent, storage device 104 may then provide an indication to host that a purge operation has been completed. With this approach, storage device 104 may incur overhead (including using up the P/E cycles on memory device 110) to erase data in logical units with TPRZ values of zeros, even though the data in these logical units do not have to be physically erased from memory device 110 since, TPRZ=0 implies no need for secure erasure. The total purge time used by storage device 104 for the purge operation may be the time associated with executing preparation operations, the time associated with relocating valid data from source meta-blocks where the validity count is between zero and one hundred percent to reduce the validity count of these meta-blocks to zero, the time associated with erasing data from meta-blocks with a validity count of zero, and the time associated with performing the flash fill operations on meta-blocks where data was erased.

In an implementation, controller 108 may categorize meta-blocks on memory device 110 based on a TPRZ value. Controller 108 may associate a first category of meta-blocks with a TPRZ value of zero and a second category of meta-blocks with a TPRZ value of one. When storage device 104 receives a write command from host 102, controller may identify the TPRZ value in the logical unit specified in the write command. If the logical unit specified in the write command has a TPRZ value of zero, controller 108 may program the data in the write command on a meta-block in the first category. If the logical unit specified in the write command has a TPRZ value of one, controller 108 may program the data in the write command on a meta-block in the second category. As such, controller 108 may program data in logical units with a TPRZ value of one in a category of meta-blocks (i.e., meta-blocks that may be erased during a purge operation and thus are more erase-secured) and data in logical units with a TPRZ value of zero in another category of meta-blocks (i.e., meta-blocks that may not be erased during the purge operation and that may be less erase-secured).

Consider an example, where host 102 issues four write commands wherein the first command is to write data associated with 192 LBAs in logical unit zero, the second write command is to write data associated with 192 LBAs in logical unit five, the third write command is to write data associated with 192 LBAs in logical unit one, and the fourth write command is to write data associated with 192 LBAs in logical unit two. If controller 108 determines that the TPRZ value for logical units zero, one, and two is one and the TPRZ value for logical unit five is zero, controller 108 will route data from the first, third, and fourth commands to meta-blocks in the second category and route data from the second command to meta-blocks in the first category.

During background operations, controller 108 may also relocate data according to the meta-block categories. For example, during garbage collection, controller 108 may relocate data from source meta-blocks in the first category to destination meta-blocks in the first category and relocate data from source meta-blocks in the second category to destination meta-blocks in the second category. Controller 108 may thus separate data stored in meta-blocks on memory device 110 based on a TPRZ value.

When host 102 issues a purge command, controller 108 may perform the related operations of identifying dirty blocks (i.e., blocks with invalid data), data relocation, physical erasure, and flash fill on meta-blocks in the second category. As such, controller 108 may only perform the purge operation on meta-blocks used to store data associated with logical units that have a TPRZ value of one (referred to herein as a first TPRZ value). As invalidated data in a logical unit where the TPRZ is set to zero need not be physically erased during a purge operation, controller 108 may condition the purge-related-operations on the TPRZ value associated with a logical unit. When controller limits the purge-related operation to meta-blocks in the second category, the number of blocks requiring garbage-collection/physical erasure may reduce. Controller 108 may also control the number of PE cycles used on memory device 110 by avoiding unnecessary erasure and flash-fill of meta-blocks in the first category, thereby increasing the longevity of memory device 110.

In one category of memory devices 110, the time to erase a physical block may be 4.4 milliseconds (ms) and the time to flash-fill the physical block may be 0.8 ms. When the validity count for a block is between zero and one hundred percent, garbage collection may be needed before physical erasure. The relocation time when the validity count is at one hundred percent may be 1300 ms. As such the total time saved during a purge operation may be:

((RLC time*VC %)+(erase time+flash-fill time))*number of meta-blocks with TPRZ=0;

i.e., the relocation time per meta-block (RLC time) multiplied by the validity count (VC) percentage, plus the erasure and flash-fill times and multiplied by the number of meta-block when the TPRZ value for a meta-block is zero. Assuming a validity count of ten percent, for 100 blocks with TPRZ equal to zero, the total time saved during a purge operation will be ((1300 ms*10%)+ (4.4 ms+0.8 ms)*100 blocks), i.e., 13520 ms or 13.5 seconds.

In configurations where host 102 configures all logical units to have a TPRZ value of zero, maximum time may be gained when a purge operation is executed as there would be no need for data to be securely removed from memory device 110. In configurations where host 102 configures all logical units to have a TPRZ value of one, no time may be gained when a purge operation is executed. In configurations where host 102 configures some logical units to have a TPRZ value of zero, some time may be gained when a purge operation is executed as there would be no need for data to be securely removed from the meta-blocks in the first category.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
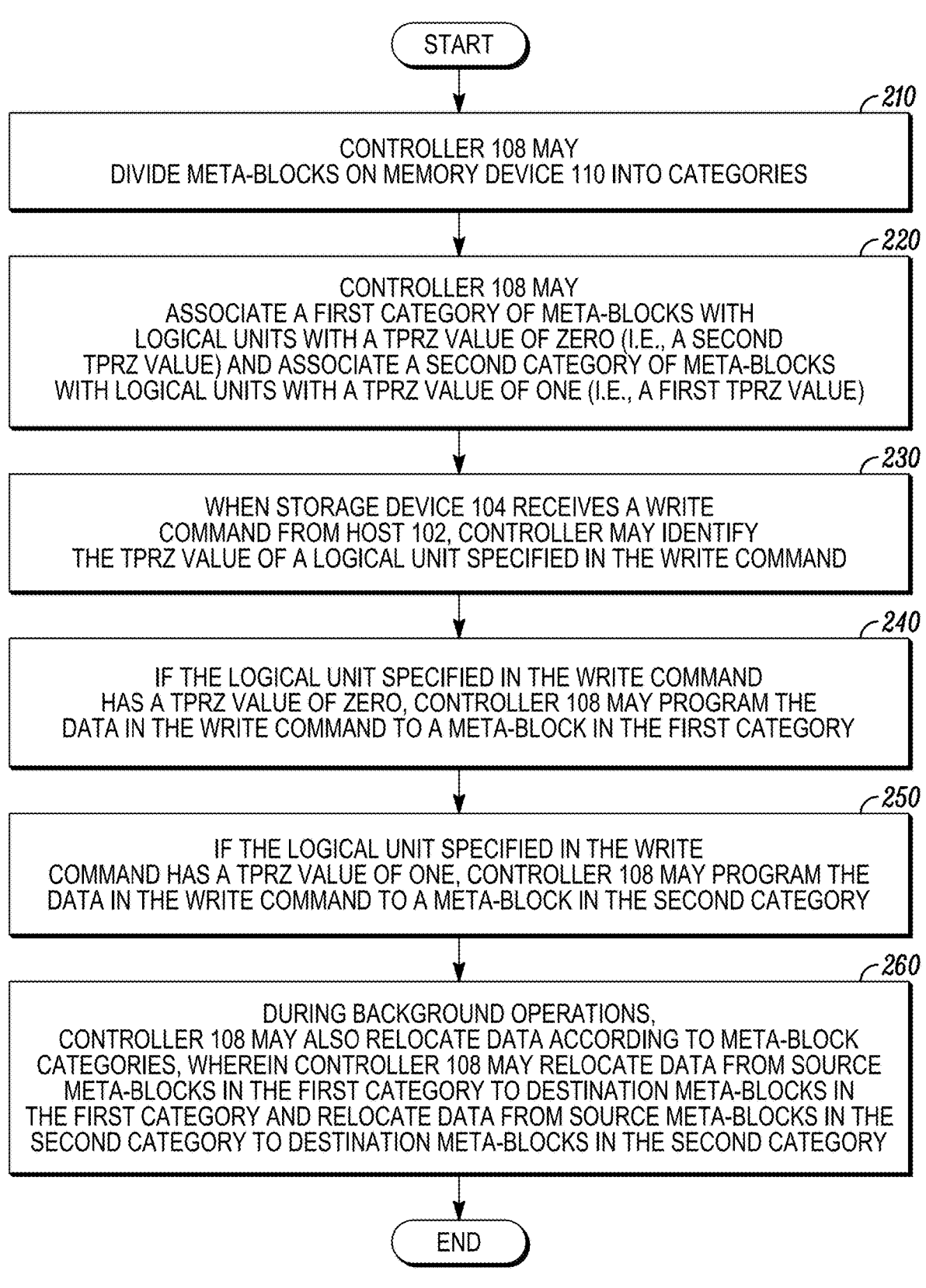
FIG. 2 is an example flow diagram for categorizing meta-blocks on a memory device to speed up purge operations executed on a storage device in accordance with some implementations.

FIG. 2 is an example flow diagram for categorizing meta-blocks on a memory device to speed up purge operations executed on a storage device in accordance with some implementations. In 210, controller 108 may divide meta-blocks on memory device 110 into categories. In 220, controller 108 may associate a first category of meta-blocks with logical units with a TPRZ value of zero (i.e., a second TPRZ value) and associate a second category of meta-blocks with logical units with a TPRZ value of one (i.e., a first TPRZ value). In 230, when storage device 104 receives a write command from host 102, controller may identify the TPRZ value of a logical unit specified in the write command. In 240, if the logical unit specified in the write command has a TPRZ value of zero, controller 108 may program the data in the write command to a meta-block in the first category. In 250, if the logical unit specified in the write command has a TPRZ value of one, controller 108 may program the data in the write command to a meta-block in the second category. In 260, during background operations, controller 108 may also relocate data according to meta-block categories, wherein controller 108 may relocate data from source meta-blocks in the first category to destination meta-blocks in the first category and relocate data from source meta-blocks in the second category to destination meta-blocks in the second category. As indicated above FIG. 2 is provided as an example. Other examples may differ from what is described in FIG. 2.

FIG. 3 is an example flow diagram for executing purge operations on a storage device in accordance with some implementations. At 310, storage device 104 may receive a purge command from host 102. At 320, controller 108 may execute preparation operations including flushing host commands and closing open blocks. At 330, controller 108 may ignore each meta-block in a first category and for each meta-block in a second category and associated with logical units that have a TPRZ value of one (i.e., a first TPRZ value), controller 108 may determine if a validity count is between zero and hundred percent. At 340, if the validity count for a meta-block in the second category is between zero and hundred percent, controller 108 may mark the meta-block for relocation. At 350, controller 108 may trigger background operations and perform garbage collection to relocate meta-blocks in the second category that are marked for relocation. At 360, controller 108 may then physically erase data from the meta-blocks in the second category that were marked for relocation and from meta-blocks with a validity count of zero. At 370, controller 108 may flash fill the meta-blocks that were erased. At 380, controller 108 may indicate to the host that the purge operation is complete. As indicated above FIG. 3 is provided as an example. Other examples may differ from what is described in FIG. 3.

Figure 4:
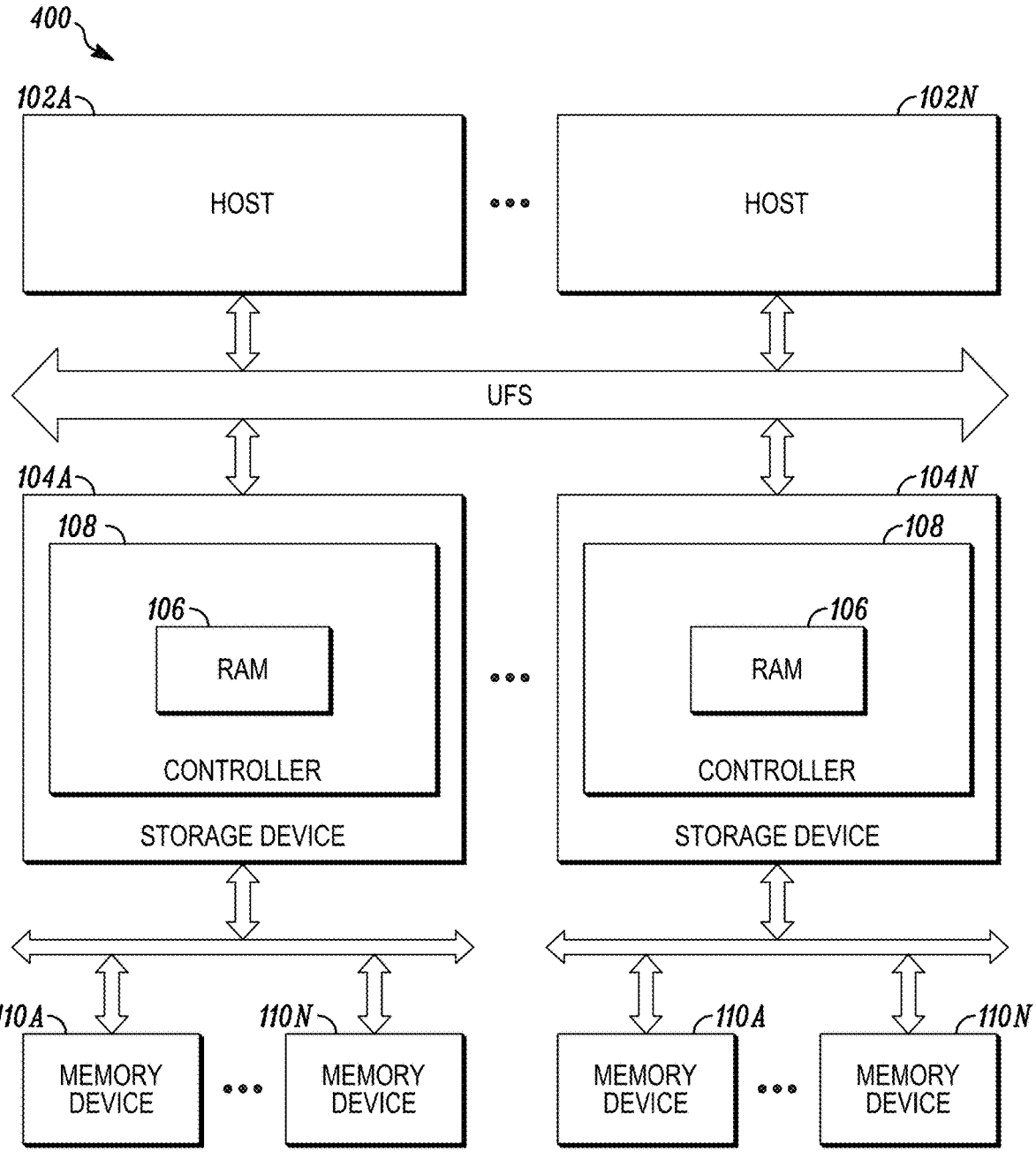
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and one or more storage devices 104a-104n (referred to herein as storage device(s) 104). Storage device 104 may categorize meta-blocks on memory device 110 and store data in meta-blocks according to a TPRZ value associated with logical units. Controller 108 may program data in logical units with a TPRZ value of one in a category of meta-blocks that may be erased during a purge operation. Controller 108 may program data in logical units with a TPRZ value of zero in a category of meta-blocks that may not be erased during the purge operation. Hosts 102 and storage devices 104 may communicate via USF or the like.

Devices of Environment 400 may interconnect via wired connections, wireless connections, or a combination of wired and wireless connections. For example, the network in FIG. 4 may include Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
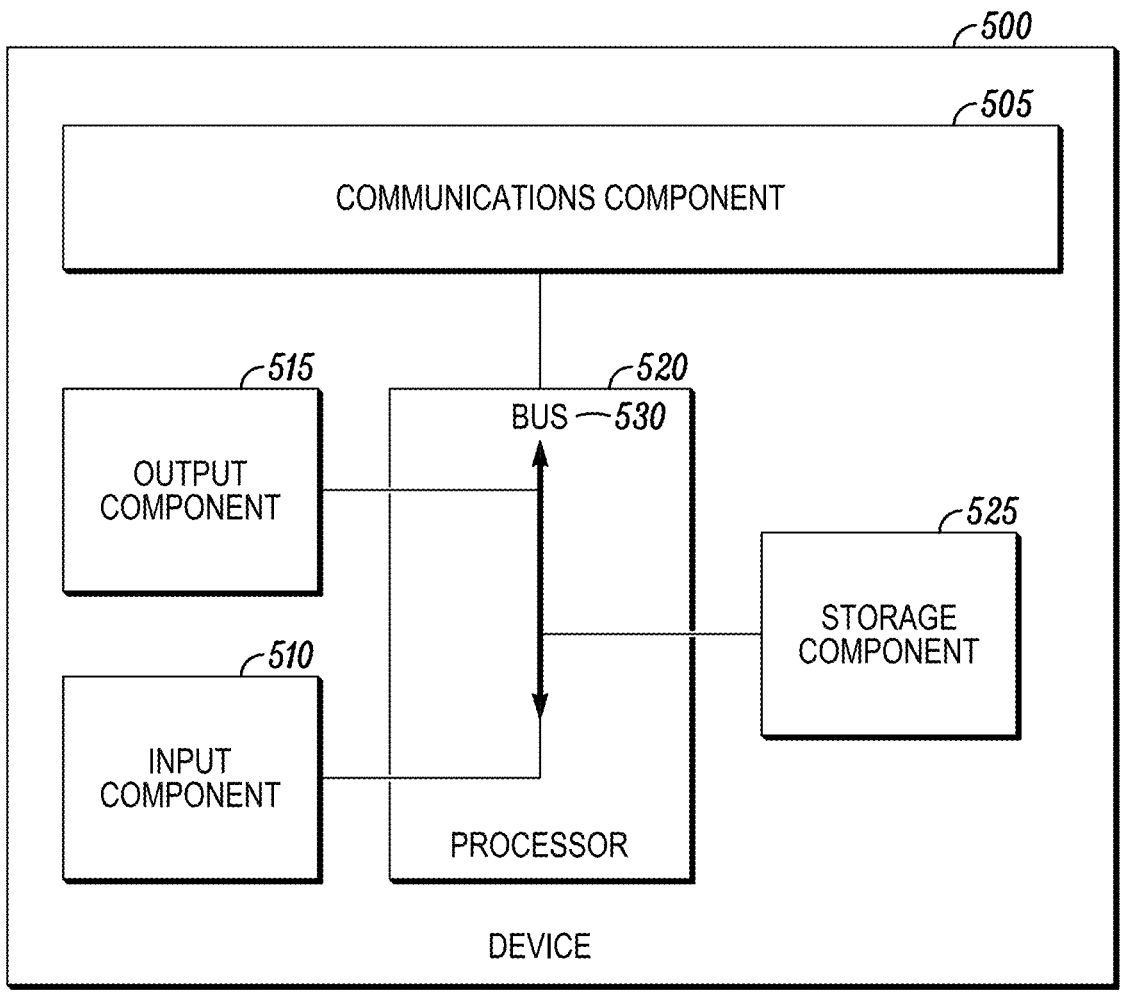
FIG. 5 is a diagram of example components of one or more devices of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, and a network/data connection port, or the like), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and network/data connection port, or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to reduce overhead associated with executing purge-related operations on a memory device, the storage device comprises:

a memory device including blocks to store data; and a controller to categorize blocks on the memory device based on a thin provisioning read zeros (TPRZ) value, separate data stored in the blocks on the memory device according to the TPRZ value, receive a purge command from a host, condition a purge operation on a first TPRZ value, and perform the purge operation on the-blocks associated with the first TPRZ value.

2. The storage device of claim 1, wherein the controller associates a first category of blocks with a TPRZ value of zero and associates a second category of blocks with a TPRZ value of one.

3. The storage device of claim 1, wherein the controller receives a write command from the host and in processing the write command, the controller identifies the TPRZ value of a logical unit specified in the write command and stores data in the write command in a category of blocks associated with the TPRZ value.

4. The storage device of claim 3, wherein the controller programs data in the write command to a block in a first category when the logical unit specified in the write command has a TPRZ value of zero and programs data in the write command to a block in a second category when the logical unit specified in the write command has a TPRZ value of one.

5. The storage device of claim 1, wherein the controller executes background operations and during a background operation, the controller relocates data from a source block in a first category to a destination block in the first category and relocates data from a source block in a second category to a destination block in the second category.

6. The storage device of claim 1, wherein the controller executes the purge operation to enforce physical erasure of invalid data associated with logical units that have the first TPRZ value.

7. The storage device of claim 1, wherein during the purge operation, the controller does not physically erase invalid data associated with logical units that do not have the first TPRZ value.

8. The storage device of claim 1, wherein in executing the purge operation, the controller executes a preparation operation;

determines that a validity count for a source block, in a category associated with the first TPRZ value, is between zero and one-hundred percent and marks the source block for relocation;

triggers background operations and relocates data in the source block to a destination block in the category associated with the first TPRZ value; and physically erases the data from the source block and flash-fills the source blocks.

9. The storage device of claim 8, wherein the controller executes the purge operation on all blocks in the memory device associated with the first TPRZ value.

10. The storage device of claim 1, wherein a time saved during the purge operation is a relocation time saved multiplied by a validity count percentage, plus a sum of an erasure time and a flash fill time and multiplied by a number of meta-block with TPRZ value of zero.

11. A method in a storage device for reducing overhead associated with executing purge-related operations on a memory device, the storage device comprises a controller to execute the method comprising:

categorizing blocks on a memory device based on a thin provisioning read zeros (TPRZ) value;

separating data stored in the-blocks on the memory device according to the TPRZ value;

receiving a purge command from a host;

conditioning a purge-operation on a first TPRZ value; and performing the purge operation on the-blocks associated with the first TPRZ value.

12. The method of claim 11, further comprising associating a first category of blocks with a TPRZ value of zero and associating a second category of blocks with a TPRZ value of one.

13. The method of claim 11, further comprising receiving a write command from the host and in processing in processing a write command, identifying the TPRZ value of a logical unit specified in the write command and storing the data in the write command in a category of blocks associated with the TPRZ value.

14. The method of claim 13, further comprising programming data in the write command to a block in a first category when the logical unit specified in the write command has a TPRZ value of zero and programming data in the write command to a block in a second category when the logical unit specified in the write command has a TPRZ value of one.

15. The method of claim 11, further comprising executing background operations, and during the background operation, relocating data from a source block in a first category to a destination block in the first category and relocating data from a source block in a second category to a destination block in the second category.

16. The method of claim 11, further comprising executing the purge operation to enforce physical erasure of invalid data associated with logical units that have the first TPRZ value.

17. The method of claim 11, further comprising during the purge operation, not physically erasing invalid data associated with logical units that do not have the first TPRZ value.

18. The method of claim 11, further comprising during the purge operation, executing a preparation operation;

determining that a validity count for a source block in a category associated with the first TPRZ value is between zero and one-hundred percent and marking the source block for relocation;

triggering background operations and relocating data in the source block to a destination block in the category associated with the first TPRZ value; and physically erasing the data from the source block and flash-filling the source blocks.

19. The method of claim 18, further comprising executing the purge operation on all blocks in the memory device associated with the first TPRZ value.

20. A method in a storage device for reducing overhead associated with executing purge-related operations on a memory device, the storage device comprises a controller to execute the method comprising:

categorizing blocks on a memory device based on a thin provisioning read zeros (TPRZ) value;

associating a first category of blocks with a TPRZ value of zero and associating a second category of blocks with a TPRZ value of one;

one of receiving a write command from a host and processing background operations to relocated data on the memory device;

programming data having the TPRZ value of zero in the first category of blocks and programming data having the TPRZ value of one in the second category of blocks;

receiving a purge command from the host;

conditioning a purge-operation on a first TPRZ value associated with the second category of blocks; and performing the purge operation on the second category of
blocks.

* * * * *